United States Patent
Raaf et al.

(10) Patent No.: US 6,580,753 B1
(45) Date of Patent: Jun. 17, 2003

(54) METHOD OF TRANSMITTING INFORMATION VIA A TELECOMMUNICATION SYSTEM AND CORRESPONDING TELECOMMUNICATION SYSTEM

(75) Inventors: Bernhard Raaf, Munich (DE); Oestreich Stefan, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/958,518

(22) PCT Filed: Apr. 10, 2000

(86) PCT No.: PCT/DE00/01095
§ 371 (c)(1),
(2), (4) Date: Dec. 27, 2001

(87) PCT Pub. No.: WO00/62448
PCT Pub. Date: Oct. 19, 2000

(30) Foreign Application Priority Data

Apr. 9, 1999 (DE) .......................................... 199 16 070
Apr. 20, 1999 (DE) .......................................... 199 17 883

(51) Int. Cl.$^7$ .............................................. H04B 01/66
(52) U.S. Cl. ............. 375/240; 375/240.23; 375/240.24; 370/477
(58) Field of Search ............................... 375/146, 140, 375/240, 240.11, 240.1, 240.23, 240.25; 370/319, 320, 335, 342, 391, 538, 543, 545, 278, 282, 437, 477, 441

(56) References Cited

U.S. PATENT DOCUMENTS 5,515,375 A * 5/1996 DeClerck .................... 370/335
5,734,967 A   3/1998 Kotzin et al.
5,818,871 A * 10/1998 Blakeney et al. ........... 370/278
5,822,318 A * 10/1998 Tiedemann et al. ......... 370/391
5,894,473 A * 4/1999 Dent ........................... 370/320
6,396,868 B1 * 5/2002 Yoon et al. .................. 370/342

FOREIGN PATENT DOCUMENTS

WO   WO 94/29981   12/1994

OTHER PUBLICATIONS

Tetsuji Kawashima et al. "Capacity Enhancement of Cellular CDMA by Traffic–Based Control of Speech Bit Rate", Aug. 1, 1996, 1–6,8–13.
Wong W T K et al, "Low Rate Speech Coding for Telecommunications", 1–6, 8–13.
UMTS (XX.04) V0.8.0 1999–01—UTRA FDD, Multiplexing, Channel Coding And Interleaving Description, European Telecommunications Standards Institute 1998, pp 1–17.
"Using Rate–Matching DTX for Intersystem Handover Preparation", ETSI SMG2 UMTS L1 Expert Group, Espoo, Helenski, Dec. 14–18, 1998, 4 pages.
"Ultra Physical Layer Description FDD Parts (v0.4, Jun. 25, 1998)", SMG2 UMTS Physical Layer Expert Group, pp 1–49.

* cited by examiner

Primary Examiner—Chi Pham
Assistant Examiner—Khanhcong Tran
(74) Attorney, Agent, or Firm—Bell, Boyd & Lloyd LLC

(57) ABSTRACT

Method for transmitting information in a radiocommunication system and corresponding radiocommunication system, the method transmitting compressed information between a transmitter and a receiver in the slotted mode by reducing the source coding rate with which the source coding is performed in the transmitter, whereby if different source coding rates are provided, the source coding rate can be optimally adapted to the operating conditions, particularly to the available transmission capacity.

11 Claims, 2 Drawing Sheets

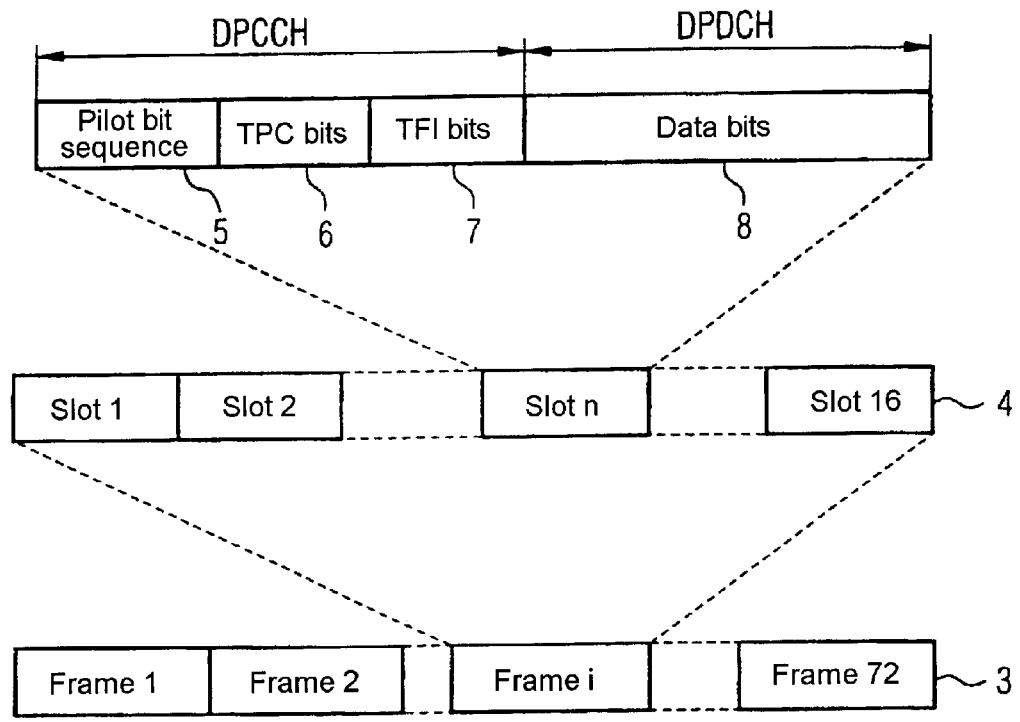
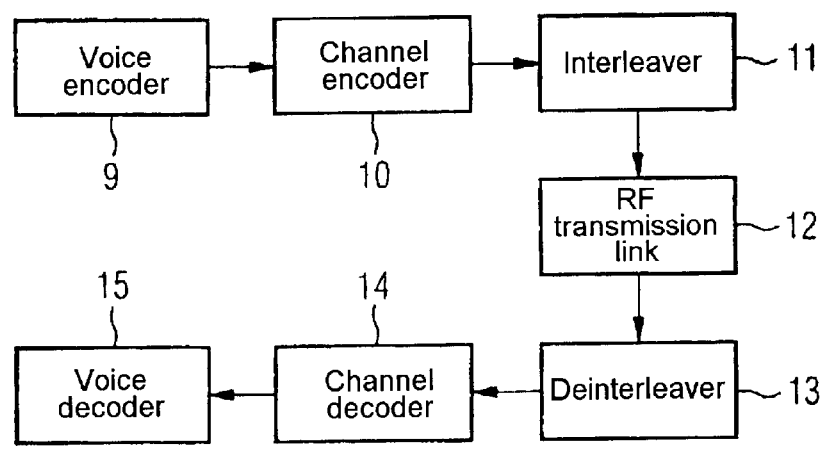

METHOD OF TRANSMITTING INFORMATION VIA A TELECOMMUNICATION SYSTEM AND CORRESPONDING TELECOMMUNICATION SYSTEM

BACKGROUND OF THE INVENTION

The present invention relates to a method for transmitting information in a radiocommunication system, the information being transmitted in compressed form between a transmitter and a receiver, and to a corresponding radiocommunication system, particularly a corresponding mobile radiocommunication system.

It is known that information is transmitted embedded in a frame structure in mobile radiocommunication systems. The frame structure includes a number of frames transmitted sequentially, each frame exhibiting a particular number of time slots. It has been proposed with regard to known mobile radiocommunication systems to operate the transmitter of the mobile radiocommunication system in a compression mode (slotted mode) where the information to be transmitted is transmitted in compressed form, within the frames, to a receiver, thereby freeing in the corresponding frame a section of information bits (i.e., the idle slot) which can be subsequently used for interfrequency measurements (i.e., measurements at other frequencies), for example, for preparing a handover between different mobile radiocommunication systems. To utilize the compression, the information must be transmitted in a shortened time interval. In this regard, various approaches are known and will be explained in greater.

FIG. 4 shows a simplified block diagram of the components involved in the coding/decoding of voice signals in a mobile radiocommunication system. The information to be transmitted via a radio-frequency transmission link 12 is initially converted into a bit sequence via a digital source encoder 9. If the information to be transmitted is voice information, a voice encoder 9 is correspondingly used. At the receiver end, a voice decoder 15 is correspondingly provided. The source-encoded or voice-encoded data are then coded with the aid of a channel encoder 10, additional redundant bits being added to the actual information bits, thereby allowing transmission errors to be detected and subsequently corrected. A corresponding channel decoder 14 is provided at the receiver end. Before the channel-encoded information is transmitted to the receiver, it can be supplied to an interleaver 11 which rearranges the data elements to be transmitted in time in accordance with a particular arrangement and at the same time spreads them in time. As a result, the errors, which, as a rule, occur in bunches, are distributed in order to obtain what is known as a memoryless transmission channel with a quasi-random error distribution, since this is presupposed by most of the channel codes. Finally, the radio-frequency transmission link or air interface 12 includes a transmit unit in the transmitter and a receiving unit in the receiver, the transmit unit modulating the data supplied to it and to be transmitted onto a carrier signal and transmitting them in accordance with a particular multiple access method to the receiving unit which down-converts the received signal again to the baseband and supplies it to a deinterleaver 13.

Thus, a first approach to compressing the information to be transmitted provides for using a higher coding rate during the channel coding in the transmitter. Since the number of information bits per frame remains constant when using a frame structure having a number of frames transmitted sequentially, what is known as an idle slot or idle section, (i.e., a section not occupied with information) that can be used for, among other things, interfrequency measurements in order to, for example, prepare a handover between different mobile radiocommunication systems, is generated with the higher coding rate in the compressed frame. This operating mode is also known as "slotted mode" and is described, for example, in the printed document UMTS xx.03, section 1.1, "Coding for Slotted Mode".

Alternatively, it is proposed in the printed document ETSI SMG2 UMTS L1Expert Group, Espoo, Helsinki, Dec. 14–18 1998, to use what is known as DTX (discontinuous transmission) time slots (i.e. slots in which no information is transmitted during silent gaps) for the aforementioned interfrequency measurements during the transmission. DTX time slots occur in certain services due to the fact that the transmission capacity needed in each case does not coincide with a possible spreading factor. However, a drawback of this method is that there is an additional delay on the order of the magnitude of the length of the respective DTX time slot (i.e., the duration of the respective slot with active voice).

In another approach, it is proposed, for the compression of the information to be transmitted, to use a smaller spreading factor when using a code division multiple access (CDMA) method as the multiple access method. When a CDMA method is used in a digital mobile radiocommunication system, all subscribers simultaneously have the capability of using the entire available system bandwidth. To avoid collisions between the individual subscribers, the digital data of the individual subscribers are provided with different code sequences which leads to spreading of the respective transmit signal so that the code sequences are also known as spread-spectrum code. The receiving unit of the receiver operates synchronously with the code sequence of the transmit unit of the transmitter and cancels again the spreading from the transmitting end. The despreading process in the receiver only despreads, and thus reduces the bandwidths, of the signal which uses the same and synchronous spread-spectrum code as the receiver. If the transmitter uses a spread-spectrum sequence which leads to lesser spreading of the transmit signal, the information to be transmitted can be compressed in time.

An object of the present invention is, therefore, to provide a further alternative for the compressed transmission of information in a radiocommunication system, particularly a mobile radiocommunication system, which can be implemented in a simple manner.

SUMMARY OF THE INVENTION

According to the present invention, the compression is achieved by the fact that the source coding rate used for the source coding in the transmitter is reduced so that the original signal, which is, for example, a voice signal, is transmitted with a lower bit rate. As was described earlier, the compression generates an idle slot in the corresponding transmission frame, which can be used for preparing a handover between different mobile radiocommunication systems.

For the source coding or voice coding, a variable source coding rate is preferably provided so that it is possible to switch between different source coding rates depending on the operating conditions. If, for example, a mobile station acting as transmitter no longer has sufficient reserve capacity for increasing the power for the source coding with the normal (increased) source coding rate, a coding rate can be used for the source coding which is reduced compared with the normal source coding rate. Thus, it is also possible to match the source coding rate to be used for the compression optimally to the available transmission capacity.

An advantage of the present invention consists in that, for voice transmissions, the compression for generating the idle slot only causes a slight impairment of the performance of the mobile radiocommunication system.

The present invention can be used in UMTS (Universal Mobile Telecommunications System) mobile radiocommunication systems to perform handover processes which can proceed, for example, analogously to the GSM (Global System for Mobile Communications) mobile radio standard. Although the AMR (adaptive multirate coder) voice coder with different voice coding rates is already known for the UMTS mobile radio standard, these different voice coding rates are only provided for different transmission conditions. According to the present invention, it is now proposed to use these different voice coding rates also for the frames operated in the slotted mode for generating the aforementioned idle slot by compressing the information to be transmitted, thereby allowing implementation in a simple manner because the frames affected are already known in advance.

Additional features and advantages of the present invention are described in, and will be apparent from, the following detailed Description of the Invention and the Figures.

BRIEF DESCRIPTION OF THE FIGURES

FIG. 3 shows a diagram illustrating the frame and time slot structure for a downlink connection according to the current state of UMTS standardization.

FIG. 4 shows a simplified block diagram of the components involved in the transmission and coding and decoding, respectively, in a typical mobile radiocommunication system.

DETAILED DESCRIPTION OF THE INVENTION

The following embodiments of the present invention are explained with reference to one preferred use, in a UMTS mobile radiocommunication system. In the embodiments described, it is assumed, for the sake of simplicity, that the information to be transmitted is voice information, however, the present invention can also be applied to other mobile radiocommunication systems and other types of information, particularly also to the transmission of data or moving picture or multimedia data in the case of UMTS mobile radiocommunication systems.

Figure 2:
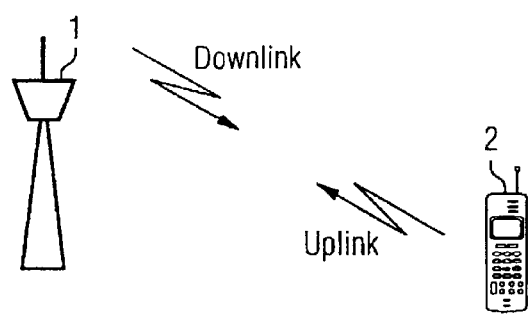
FIG. 2 shows a general diagrammatic representation for explaining the information transmission in a typical mobile radiocommunication system.

FIG. 2 shows a diagram illustrating the typical communication link between a base station 1 and a mobile station 2 of a mobile radiocommunication system. In general, a connection from the base station 1 to the mobile part 2 is called a downlink or forward link connection whereas a connection from the mobile part 2 to the base station 1 is called an uplink or reverse link connection. A "slotted" downlink transmission is known as a special case of a downlink connection. As previously explained, an attempt is made at the transmitting end in this slotted mode to compress the information to be transmitted in time within a corresponding frame (i.e., slotted frame) in order to generate, in this manner, in the frame, a section not occupied by information bits and called an idle slot, which, for example, can be used for interfrequency measurements for preparing a handover between different mobile radiocommunication systems.

FIG. 3 shows the frame and time slot structure for a downlink connection via a UMTS mobile radiocommunication channel, also called DPCH (dedicated physical channel). In general, the frame structure, having a duration of 720 ms, includes 72 frames 3 of identical structure and having a frame duration of 10 ms, each frame in turn having 16 time slots 4 with a time slot duration of 0.625 ms. Each time slot 4 includes bit information which is divided into a logical control channel (DPCCH—dedicated physical control channel) and a logical data channel (DPDCH—dedicated physical data channel). The bits of the DPCCH section include a pilot bit sequence 5 and TPC (transmitter power control) bits 6 for power control and TFI (transmitter format identifier) control bits 7 as format identifier. The DPDCH section includes user data bits 8. The structure shown in FIG. 3 can be found, for example, in the document ETSI STC SMG2 UMTS-L1: Tdoc SMG2 UMTS-L1 221/98. The uplink frame structure is similar to the downlink frame structure but the differences between the individual frame structures are of little significance for the present invention.

In the transmitter, it is known from the start which of the frames 3 transmitted sequentially are to be operated in the slotted mode. For this purpose, the information contained in these frames and to be transmitted, respectively, must be compressed at the transmitting end in order to transmit this information within a shortened time interval in the corresponding frames.

According to the an embodiment of the present invention, it is proposed for this purpose to implement the compression via the source encoder or voice encoder 9, shown in FIG. 4, by using for the voice coding a voice coding rate which is reduced compared with the usual voice coding in order to compress the information or voice signal to a lower bit rate.

Figure 1:
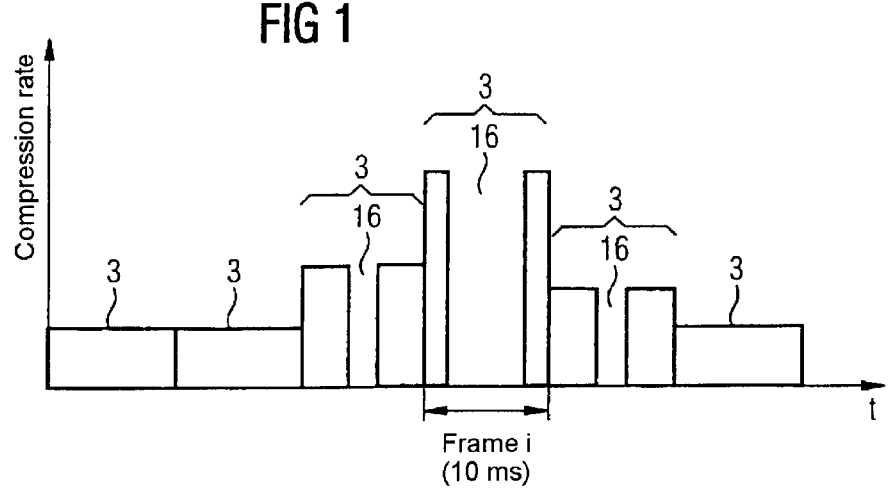
FIG. 1 shows a graph illustrating a simplified representation of compression rates, used when information to be transmitted in accordance with the principles of the present invention is compressed.

FIG. 1 shows an embodiment of the present invention having six frames 3 following one another in time, together with the compression rates used for the respective frames by the voice encoder 9 (see FIG. 4). The first two frames 3 shown in FIG. 1 are coded with a normal voice coding rate in accordance with the currently known prior art. These two frames are followed by three frames 3 coded with lower voice coding rates or, respectively, higher compression rates according to the present invention. By using lower voice coding rates, the information bits to be transmitted within the respective frame are transmitted during a shorter time interval so that, in each of these frames, an idle slot 16 is generated which is not occupied by information bits.

As mentioned earlier, the idle slot 16 can be advantageously used for interfrequency measurements in order to prepare a handover between different mobile radiocommunication systems which is an essential performance feature for two-band or multi-band mobile stations. If, for example, a connection is to be transferred from a UMTS mobile radiocommunication system operated in accordance with the frequency division duplex (FDD) method, in which different transmission frequencies are provided for the uplink and downlink connection in order to be able to transmit and receive at the same time, to the GSM mobile radiocommunication system, a power measurement of the so-called BCCH (broadcast control channel) carriers of the GSM mobile radiocommunication system must be performed and the frequency correction channel (FCCH) and the synchronization channel (SCH) of the GSM mobile radiocommunication system must be detected, decoded and coordinated with the power measurements performed previously, for preparing the handover. In an embodiment, the measurements described above can be performed within the idle slots 16, indicated in FIG. 1, if they are long enough.

In an embodiment, the voice encoder 9 of the transmitter can provide different voice coding rates which are used in dependence on the operating conditions. As shown in FIG. 1, the center frame 3 is coded with the lowest voice coding rate and correspondingly with the highest compression rate which correspondingly results in the longest time duration of the idle slot 16. Although the two adjacent frames are also coded with a reduced voice coding rate compared with the normal voice coding rate in order to compress the information to be transmitted, their voice coding rate is higher compared with that of the center frame 3 so that the time duration of the idle slot 16 formed in them is also shorter.

In an embodiment, in the transmitter, a unit can be provided, for example, which detects the transmission capacity instantaneously available and reports it to the voice encoder so that the latter selects, and uses for the voice coding, the optimum voice coding rate in each case in dependence on the available transmission capacity. The transmission capacity essentially depends on the transmitting power of the mobile station 2 in the uplink and on the total power of the base station 1 in the downlink. Similarly, the voice coding rate can be reduced in the mobile station in the case where the transmitter is a mobile station 2 if the mobile station 2 no longer has sufficient spare capacity for increasing the power as required for the voice coding with a relatively high voice coding rate.

According to an embodiment, the voice encoder 9, is constructed in such a manner that it provides three different voice coding rates. The highest voice coding rate is used for voice coding the frames not to be transmitted in compression mode or slotted mode, respectively. In contrast, the other two lower voice coding rates are used for the slotted mode and the higher voice coding rate of these is used if the transmitting power is adequate for this. If not, the lower voice coding rate is used for the slotted mode. Both voice coding rates, which are reduced compared with the conventional voice coding rate, generate an idle slot having a time duration which is sufficient for interfrequency measurements.

In an embodiment, changing the source coding rate can also be combined with other compression methods as have been mentioned in the introduction to the description. For example, the channel coding rate can also be changed, or another spreading factor used, in addition to the reduction of the source coding rate. This becomes advantageous when the reduced source coding rate is not sufficient for generating a sufficiently long idle slot 16.

According to an embodiment, the source coding rate is reduced by such an amount that the corresponding information can be transmitted without increasing the transmitting power.

Although the present invention has been described with reference to specific embodiments, those with skill in the art will recognize that changes may be made thereto without departing from the spirit and scope of the invention as set forth in the hereafter appended claims.

What is claimed is:

1. A method for transmitting information, embedded in a frame structure, in a telecommunication system, the method comprising the steps of
   converting information to be transmitted into digital data by source coding in a transmitter, wherein information to be transmitted in particular frames of the frame structure is compressed in the transmitter by reducing a source coding rate with which the source coding is performed and by at least one of changing a channel coding rate with which the information to be transmitted is subjected to channel coding in the transmitter and changing a spreading factor via which the information to be transmitted is spread in the transmitter;
   modulating the information to be transmitted onto a carrier signal; and
   transmitting the information to a receiver.

2. A method for transmitting information as claimed in claim 1, wherein the source coding rate is individually adapted for each frame in the transmitter.

3. A method for transmitting information as claimed in claim 1, wherein the information to be transmitted in the particular frames of the frame structure is transmitted within a shorter transmission time than the information to be transmitted that is not in the particular frames, a reduced source coding rate being used for the particular frames compared to the non particular frames.

4. A method for transmitting information as claimed in claim 2, wherein the shorter a transmission time of the respective frame during which the corresponding information is transmitted, the lower the source coding rate is selected.

5. A method for transmitting information as claimed in claim 1, wherein the source coding rate for the source coding is selected in dependence on an available transmission capacity.

6. A method for transmitting information as claimed in claim 1, wherein the source coding is normally performed with a certain standard source coding rate, and the source coding is performed with a source coding rate which is reduced compared with the standard source coding rate if a transmitting power of the transmitter is not sufficient for the standard source coding rate.

7. A telecommunication system, comprising:
   a transmitter, the transmitter including a source encoder for source coding information in order to convert the information digital data, the source encoder provides different source coding rates for performing the source coding, and the source encoder performs the source coding with a reduced source coding rate for transmitting the information in a compressed form, the transmitter further including a transmit unit for modulating the information thus source coded onto a carrier signal and for transmitting the information, embedded in a frame structure, wherein the information in the compressed form is in particular frames of the frame structure and wherein the compression of the information is performed, in addition to changing the source coding rate, also by at least one of changing a channel coding rate with which the information is subjected to channel coding in the transmitter and changing a spreading factor via which the information is spread in the transmitter; and
   a receiver, wherein the information being transmitted from the transmit unit is transmitted to the receiver.

8. A telecommunication system as claimed in claim 7, wherein the source encoder individually adjusts the source coding rate for each frame of the frame structure.

9. A telecommunication system as claimed in claim 7, wherein the source encoder adjusts the source coding rate in dependence on an available transmission capacity.

10. A telecommunication system as claimed in claim 7, wherein the source encoder normally performs the source coding using a standard source coding rate and the source encoder performs the source coding with a source coding rate which is reduced compared with the standard source coding rate if a transmitting power of the transmit unit is not sufficient to support the standard source coding rate.

11. A telecommunication system as claimed in claim 7, wherein the transmit unit transmits the information to the receiver in accordance with the UMTS mobile telecommunication standard.

* * * * *